UNITED STATES PATENT OFFICE.

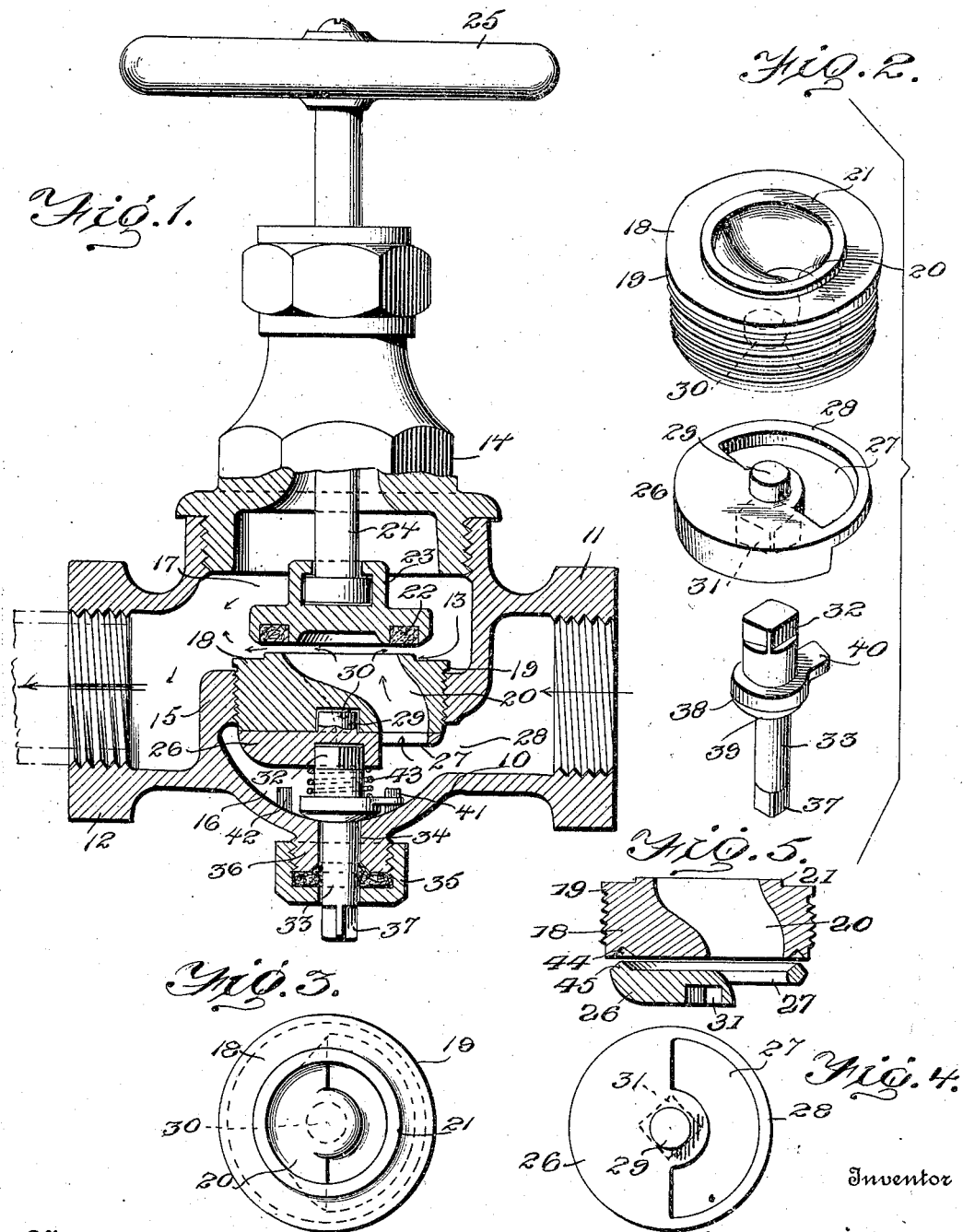

ALBAN O. LEVICK, OF PEABODY, MASSACHUSETTS, ASSIGNOR OF ONE-THIRD TO HARRY W. HUSSEY, OF PEABODY, MASSACHUSETTS.

GLOBE-VALVE.

1,072,744.  Specification of Letters Patent.  Patented Sept. 9, 1913.

Application filed June 7, 1912. Serial No. 702,322.

*To all whom it may concern:*

Be it known that I, ALBAN O. LEVICK, a subject of the King of Great Britain, residing at Peabody, in the county of Essex and State of Massachusetts, have invented certain new and useful Improvements in Globe-Valves, of which the following is a specification.

My invention relates to new and useful improvements in valves, and the primary object of my invention is to provide a double cut-off valve in place of the single cut-off valves now in general use.

It is a matter of common knowledge that in valves of the globe type it often becomes necessary to remove the valve bonnet and valve in order to renew the packing of the valve. In order to do this it is necessary to shut off the flow of water through the valve, this usually being done by means of a second valve located between the first and the source of water supply. The valve supplied for this purpose is generally located in the main supply pipe at a point just within the building and the cutting off of water by this valve will therefore cut-off the water supply to all parts of the building. By providing a globe valve of the double cut-off type it is possible to remove the bonnet and repair the valve without cutting off the supply of water from any part of the building save that to which the water is supplied through the specific pipe in which the valve being repaired is located.

It will therefore be apparent that the main object of my invention is to provide a valve for distributing pipes for water, steam or the like, which may be repaired without shutting off the flow to other portions of the distributing system.

A further object of my invention is to accomplish this by providing a valve having a double faced valve seat and a cut-off valve co-acting with each of the faces of the valve seat to cut off the flow of water therethrough.

A further object of my invention is to so construct and position the valve seat and the valves with respect to the seat that either valve may be operated independently of the other.

A further object of my invention is to provide a valve seat which may be employed with the usual form of valve, and an auxiliary valve co-acting with the opposite face of the valve seat and movable to close the passage therethrough either when the main valve is open or closed.

A still further object of my invention is to so mount the auxiliary valve upon its valve stem that it is free for movement toward and away from the valve seat and to provide means for yieldably holding said valve in engagement with its seat. And a still further object of my invention is to provide means for limiting the movement of the auxiliary valve so that the operator can readily tell whether the valve is fully open or fully closed.

With these and other objects in view, my invention will be more fully described, illustrated in the accompanying drawings, and then specifically pointed out in the claims which are attached to and form a part of this application.

In the drawings: Figure 1 is a vertical longitudinal sectional view, showing the construction of my double cut-off valve, both the main valve and the auxiliary valve being open; Fig. 2 is a perspective view of the double valve seat and the auxiliary valve, the parts being disassembled to more clearly show their formation; Fig. 3 is a top plan of the valve seat; Fig. 4 is a top plan of the auxiliary valve removed from its seat. Fig. 5 is a sectional view of a slightly modified form of valve seat and auxiliary valve.

Corresponding and like parts are referred to in the following description and indicated in all the views of the drawings by the same reference characters.

The preferred embodiment of my invention includes a globe valve casing 10 of the usual or any preferred type having oppositely disposed, internally threaded coupling portions 11 and 12 and a central, substantially cylindrical valve chamber 13, the open upper end of which is normally closed by a threaded bonnet 14 in the customary manner. The valve chamber extends vertically of the casing and is centrally divided by a transversely extending web 15 into a lower chamber 16 and an upper chamber 17. Water flowing through the valve passes through the portion 11 to the chamber 16 through the passage of a valve seat 18 threaded into an opening in the web 15 to the chamber 17, and from the chamber 17 through the portion 12 to the pipe, as clearly shown by the arrows in Fig. 1 of the drawings.

The double faced valve seat, which has been previously designated by the numeral 18, comprises a substantially cylindrical body portion externally threaded for engagement through the web of the valve and provided at its upper end with a laterally directed, annular shoulder 19 for limiting its movement through the web. Formed through this body member, is a water passage 20 which, as shown, in Fig. 2 of the drawings, is of irregular shape, being semi-annular in section at its lower end and circular in section at its upper end, the change from end to end being gradual and such that the passage has a uniform cross sectional area throughout its length. By this means, the flow of water through the passage is in no way checked and the upper face of the valve seat may be formed to co-act with the customary form of cut-off valve, while the lower face may be formed to co-act with my auxiliary cut-off valve. The upper face of the valve seat is provided with an upstanding annular shoulder 21 surrounding the upper end of the water passage 20 and adapted to be engaged by the packing ring or gasket 22 of the usual cut-off valve 23 which is of standard type, circular in shape and swivelly mounted upon a valve stem 24 which is threaded through a suitable packing box, not shown, carried by the bonnet 14 and which is provided at its free end with a hand wheel 25 by means of which the cut-off valve 23 may be raised or lowered to open and close the upper end of the passage through the valve seat.

The valve thus far described, with the exception of the peculiar form of water passage provided in the valve seat, is so nearly of the customary type that a further detailed description of the same is unnecessary.

My invention consists chiefly in the application of an auxiliary cut-off valve positioned and arranged for independent movement to cut off the flow of water to the valve seat. This auxiliary valve consists of a circular body member 26 having a semi-annular, concentrically positioned port or passage 27 which, in one position of the valve, registers with the lower end of the passage 20 through the valve seat. The rim or portion 28 of the valve, formed by the provision of the passage 27, serves to assist the main body of the valve in maintaining the valve in its bearing against the valve seat and is preferably reduced in thickness, as shown, to offer less obstruction to the passage of water through the valve when open. In order to hold the valve in proper position against the lower face of the valve seat, I have provided the valve with a centrally formed upwardly directed cylindrical stud 29 which engages in a cylindrical socket 30 formed centrally in the lower face of the valve seat. The lower face of the valve seat and the co-acting face of the auxiliary valve 26 may be formed with ground bearing surfaces to insure close engagement, if desired.

The lower face of the auxiliary valve 26 is provided with a squared socket 31 adapted to receive the squared upper end 32 of a valve stem 33. The free end of this valve stem extends through a suitable bore 34 formed in the bottom of the valve casing and through a packing nut 35 threaded upon a nipple 36 extending from the casing and the free end of the stem is squared or otherwise shaped, as shown at 37 for engagement with a wrench or other tool. The valve stem 33 is provided intermediate its length with an encircling shoulder 38, the upper face of which is flat, while the lower face is beveled, as shown at 39 for close engagement against the inner face of the bottom of the valve casing. Formed integrally with this shoulder 38, is a laterally directed lug 40 and lugs 41 and 42, preferably formed integrally with the valve casing extend upward in position to be engaged by this lug 40 and so limit the turning of the valve stem and its valve. As shown, the lug 41 is so positioned as to prevent the rotation of the valve beyond its fully opened position, while the lug 42 is arranged to prevent the movement of the valve beyond its fully closed position. It will therefore be seen that if the valve stem is turned as far as possible in one direction, the valve will be fully opened, while if turned as far as possible in the opposite direction, the valve will be fully closed.

Surrounding the valve stem 33 and bearing between the upper face of the shoulder 38 and the lower face of the auxiliary valve 26, is a relatively strong helical spring 43 which maintains the auxiliary valve in close engagement against the lower face of the valve seat and which also maintains the beveled lower face 39 of the valve stem shoulder in close engagement against the inner face of the valve casing, thereby assisting the packing nut in preventing leaking of the valve. As will be readily seen, the provision of this spring and the mounting of the auxiliary valve upon its valve stem for movement toward and away from the valve seat, permits the automatic taking up of wear between the valve and valve seat and also between the shoulder of the valve stem and the valve casing. Moreover, when the auxiliary valve is closed, the pressure of water against the valve will assist the spring in maintaining the valve in close engagement with the valve seat.

In the manufacture of the valve, the parts may be readily assembled by first positioning the auxiliary valve stem 33 and spring 43 and then applying the auxiliary valve and locking the same in place by the positioning of the valve seat, after which the main cut-off valve and bonnet may be applied in the usual manner.

From the foregoing description, taken in connection with the drawing, the operation of my improved double cut-off valve will be readily understood. Under normal conditions, the auxiliary valve is fully opened and the flow of water through the valve is regulated by the main valve 23 in the customary manner. Should the main valve become leaky through the wearing or cutting away of the packing ring 22, the auxiliary valve may be temporarily employed in its place, the main valve being left open. The chief idea of my invention however, is not to employ the auxiliary valve as a service valve in place of the main valve, but merely as an emergency valve for closing the passage of water or other fluid through the valve during the removal and repair of the main valve. When the main valve therefore, gets out of order, the auxiliary valve may be closed and the bonnet 14 and main valve removed without necessitating the first cutting off of the water by another valve between the valve being repaired and the source of supply. In many instances, it is not only necessary to cut off the water between the source of supply and the valve being repaired, but it is also necessary to drain the water from the pipe between the two valves. With this valve, the auxiliary valve absolutely cuts off the flow of water through the valve and this draining is unnecessary.
Although great stress has been laid upon the use of this valve in connection with water supply systems, it will of course be understood that it may be applied with equal facility to steam distributing systems or in fact to systems of any kind in which a fluid is transmitted through a pipe or series of pipes.

The valve seat and auxiliary valve shown in Fig. 5 are identical with that shown in the other figures with the exception that the lower face of the valve seat is provided with an annular concentric groove 44 preferably V-shaped in section, while the upper face of the auxiliary valve is provided with a correspondingly positioned shoulder 45 which engages in the groove and assist in forming a fluid tight joint.

Having thus described the invention, what is claimed as new is:

1. A double cut-off valve including a valve casing, a double faced valve seat provided with a water passage and with a cylindrical socket in its lower face, a cut-off valve co-acting with the upper face of said valve seat, a rotary cut-off valve co-acting with the lower face of the valve seat and having a centrally formed stud seating in the socket of the valve seat and also provided with a squared socket in its lower face, a valve stem extending through the valve casing and having a squared inner end engaging in the squared socket of the second mentioned valve, a shoulder formed upon the valve stem and bearing against the inner face of the valve casing, a spring bearing between said shoulder and the valve, a lug extending from said shoulder, and means carried by the valve casing and co-acting with said lug to limit the turning of the valve stem and its valve.

2. A double cut-off valve including a valve casing, a double faced valve seat having an irregular water passage therethrough and a concentric annular groove in its lower face, a valve co-acting with the upper face of said seat and a valve co-acting with the lower face of said seat, said latter valve having an annular shoulder seating in the groove of the valve seat.

3. A double cut-off valve including a valve casing, a double faced valve seat provided with a water passage and with a cylindrical socket in its lower face, a cut-off valve co-acting with the upper face of said valve seat, a rotary cut-off valve co-acting with the lower face of the valve seat and having a centrally formed stud seating in the socket thereof, a valve stem detachably engaging said second valve, and means carried by the valve stem for holding said second valve in engagement with its valve seat.

4. A double cut-off valve including a valve casing, a double faced valve seat provided with a water passage and with a cylindrical socket in its lower face, a cut-off valve co-acting with the upper face of said valve seat, a rotary cut-off valve co-acting with the lower face of said valve seat and having a centrally formed stud seating in the socket of the valve seat and a centrally formed squared socket in its lower face, and a valve stem for said latter valve having a squared terminal seated in the squared socket of the valve.

5. A double cut-off valve including a valve casing, a double faced valve seat provided with a water passage and with a cylindrical socket in its lower face, a cut-off valve co-acting with the upper face of said valve seat, a rotary cut-off valve co-acting with the lower face of the valve seat and having a centrally formed stud seating in the socket of the valve seat and also provided with a squared socket in its lower face, a valve stem extending through the valve casing and having a squared inner end engaging in the squared socket of the second mentioned valve, a shoulder formed upon the valve stem and bearing against the inner face of the valve casing, and a spring bearing between said shoulder and the valve.

In testimony whereof I affix my signature in presence of two witnesses.

ALBAN O. LEVICK. [L. S.]

Witnesses:
KENNETH J. MACCHARLES,
GEORGE W. BOETTNER.

Copies of this patent may be obtained for five cents each, by addressing the "Commissioner of Patents, Washington, D. C."